United States Patent
Waltersbacher (10) Patent No.: US 7,771,152 B2
(45) Date of Patent: Aug. 10, 2010

(54) RACK MODULE AND METHOD FOR REARRANGING STORED GOODS IN A RACK MODULE

(75) Inventor: Gerhard Waltersbacher, Kappelrodeck (DE)

(73) Assignees: KEURO Besitz GmbH & Co., Achern (DE); EDV-Dienstleistungs KG, Achern (DE)

( * ) Notice: Subject to any disclaimer, the term of this patent is extended or adjusted under 35 U.S.C. 154(b) by 1206 days.

(21) Appl. No.: 11/359,338

(22) Filed: Feb. 22, 2006

(65) Prior Publication Data

US 2006/0245861 A1 Nov. 2, 2006

(30) Foreign Application Priority Data

Feb. 28, 2005 (DE) .................. 10 2005 009 695

(51) Int. Cl.
*B65G 1/00* (2006.01)
(52) U.S. Cl. .................. 414/280; 414/279; 414/281; 414/286
(58) Field of Classification Search .................. 414/279, 414/280, 281, 286
See application file for complete search history.

(56) References Cited

U.S. PATENT DOCUMENTS 3,187,917 A * 6/1965 Miller .......................... 414/664
6,824,345 B2 * 11/2004 Hansl et al. .................. 414/282

* cited by examiner

OTHER PUBLICATIONS

Definition of shelf (b) from www.answers.com.*

*Primary Examiner*—Michael S Lowe
(74) *Attorney, Agent, or Firm*—Volpe and Koenig, P.C.

(57) ABSTRACT

A rack module for, in particular, rod or plate-shaped storage goods accepted in transportation cases as well as a method for repositioning storage goods in a rack module is provided. The rack module is provided with several shelf spaces serving to receive the transportation cases as well as a storage and retrieval unit with a gripping device that can be displaced in reference to the storage and retrieval unit for repositioning the transportation cases. The transportation cases comprise pallets, with at least one lift truck for moving under and repositioning the pallets being provided, and a lifting device for raising and/or lowering one or more pallets, which can be operated by the gripping device of the storage and retrieval unit. Accordingly, the transportation cases in the form of pallets are repositioned by way of at least one lift truck, and for said purpose the lift truck undercuts at least the pallet to be repositioned and parts of the lift truck perform a lifting motion for raising the pallet, with the lifting motion of the lift truck again being caused by a gripping motion of the gripping device of the storage and retrieval unit.

15 Claims, 6 Drawing Sheets

Fig. 1

RACK MODULE AND METHOD FOR REARRANGING STORED GOODS IN A RACK MODULE

BACKGROUND

The invention relates to a rack module for stored goods, particularly rod or plate-shaped stored goods accepted in transportation cases, having at least one shelf, with the shelf having several shelf sections arranged side-by-side and/or over top of one another serving to accept transportation cases, and with at least one storage and retrieval unit, with the storage and retrieval unit being provided with a gripping device for repositioning the transportation cases that can be displaced in reference to the storage and retrieval unit, in particular horizontally. Additionally, the invention relates to a method for repositioning stored goods in a rack module with at least one shelf comprising several shelf sections positioned side-by-side or over top of one another and having at least one storage and retrieval unit comprising at least one gripping device for repositioning the stored goods, with the stored goods being accepted inside transportation cases and the transportation cases being repositioned out of and/or into the shelf sections by means of the gripping device provided on the storage and retrieval unit.

Usually, in prior art, a rack module for long goods, which generally are transported and stored in long goods cassettes, and a rack module for pallets, in particular Euro-pallets, are distinctly separated, and it is impossible to combine these two rack module types and/or to operate them with the same storage and retrieval unit. However, if a rack module arrangement shall be provided being suitable both for long-goods as well as for pallets, at best additional transportation sleds can be used, i.e. long-goods cassettes with receivers for Europallets arranged at their upper side.

This way it is possible to store the pallets in a rack module for long-goods cassettes by means of a transportation sled and also to manipulate them with the conventional storage and retrieval unit for long-goods cassettes.

An essential disadvantage in the use of additional transportation sleds is the fact that each transportation sled causes additional costs in the amount of approximately €500.00, so that in a rack module with 1000 spaces, additional expenses in the amount of €500,000.00 would arise for the additional transportation sleds alone. Furthermore, the additional weight of the transportation sleds of approximately 100 kg per sled would result in a respective weight increase for the entire rack module and also in an increase of the weight to be manipulated by the storage and retrieval unit because the device has to lift and transport not only the weight of the transportation sled but additionally the weight of all pallets supported thereby in addition to the stored goods.

SUMMARY

Based on this, the objective of the present invention is to provide a rack module of the type mentioned at the outset, which allows a faster and simpler repositioning of pallets and which is preferably suitable for storing and manipulating both long-goods cassettes as well as pallets, but which requires considerably less expenses than the solution with the additional transportation sleds described above.

This objective is attained according to the invention in that the transportation cases comprise pallets, and that additionally at least one lift truck is provided for moving under them and to reposition the pallets, the lift truck is provided with a lifting device for raising and/or lowering one or more pallets of a rack module, and the lifting device can be operated in connection with the gripping device of the storage and retrieval unit.

Due to the additional lift truck it is possible to use a storage and retrieval unit that is commonly used for long-goods cassettes, having a gripping device without any additional retrofitting for the use for pallets (as well), by the pallets being transported out of the shelf spaces with the help of the lift truck and then be repositioned together with the lift truck at the desired target location by the storage and retrieval unit, for example at a cutting center or to another storage space.

Although the lift truck is allocated to the storage and retrieval unit, here, however, if said storage and retrieval unit is to be used for the handling of long-goods cassettes, the lift truck can simply be stored intermittently in an empty storage space and be fetched by the shelf operating system again out of the storage space prior to the next repositioning of a pallet.

Here, it is particularly advantageous in the sense of reducing the production expenses for such a rack module in that the lift truck is not provided with a lifting drive of its own but can be operated in a very simple manner by the gripping device of the storage and retrieval unit already present in any case, which serves to manipulate the long-goods cassettes, with which the lift truck performs a raising and/or lowering motion by way of the lifting device allocated thereto, by which the pallets are lifted and removed in reference to the shelf space and/or can be stored and/or lowered.

In the lowered position, the lift truck is capable of extending into a certain shelf space below the pallets up to the end of the last pallet to be removed, then lift the pallet to be removed, and remove the pallets from the shelf space, leaving any potentially remaining pallets in the respective shelf space.

For this purpose the lift truck is beneficially provided with a pallet support and transportation means, by which the lift truck can be transported into a shelf space, with the pallet support being arranged with its height position being variable between a lowered and a raised position in reference to the transportation means, and with a height change being generated via the lifting device.

It is additionally advantageous for the lift truck to be provided with two pallet supports, which can be adjusted independent from one another, if necessary, i.e. which can be raised and lowered. Here, it is possible, on the one hand, to operate both pallet supports from the same side of the lift truck. Additionally, the lift truck can also be constructed symmetrically, so that it can be operated from both sides, respectively, and thus originating from the storage and retrieval unit it can also be inserted into the shelves on both sides of the aisle left for the shelf operating system and be used for repositioning any pallets.

With regard to the transportation of the lift truck into the shelf space and/or out of the shelf space, this transportation occurs advantageously via a gripping device engaging the lift truck via a horizontal displacement motion, as already performed during the removing and/or storing of long-goods cassettes. Here, the transportation means comprise rollers, gliding rails, or other comparably suitable means.

It is particularly advantageous when the shelf spaces are embodied with a depth of such an extent in the horizontal direction that at least two, in particular, at least four pallets can be stored behind one another in one shelf space. By way of such a deep embodiment of the shelf sections, essential advantages of the rack module according to the invention can be used, in that the storage and retrieval unit is already capable of manipulating respectively long and/or deep storage goods because of the manipulation of the long-goods cassettes. Using such a multiple-depth shelf space as well as a lift truck capable of repositioning a respectively large number of pallets, the speed of repositioning can be drastically increased, of course, because in a single repositioning process four or five pallets can be manipulated simultaneously, even if they are not heading for the same target position. Even if the lift truck is suitable for the handling of one pallet only, it can still allow an overall faster repositioning by repositioning individual pallets and their intermediate storage, for example on the lift beam of the storage and retrieval unit.

As already indicated, the lift truck shall not only be operable for the repositioning of all pallets of a shelf space but also for the repositioning of only the front-most and/or several frontal pallets so that this way, for example, in a particularly advantageous manner a nightly pre-commissioning of the pallets into a certain rack module area can occur according to the commissions to be worked upon the following morning. This means that different pallets to be worked upon subsequently can be arranged in a shelf space and these pallets can be retrieved successively one-by-one or in groups with the help of the lift truck and be transported for the further processing.

With regard to the lifting device, a pivoting lever arrangement is recommended here, for example a guiding rod assembly comprising a sloped guide plane and glide rod sections thereon, or similar drive arrangements that are easily movable, yet strong. In a symmetrical structure of the lift truck and, in particular, in two pallet supports the lift truck can also be provided with two lifting devices and/or with one lifting device, which can be operated from both sides of the lift truck.

The shelf spaces should be provided with guide rails extending in the direction of the depth of the shelf sections for the transportation means of the lift truck, i.e. particularly for the transportation rollers as well as additional pallet supports for the pallets to be stored, with the pallet supports of the shelf sections having to be arranged higher than the pallet supports of the lift truck in the lowered position, however lower than the pallet support of the lift truck in the raised position in order to, on the one hand, allow the pallets to be moved under by the lift truck and, on the other hand, the pallets to be stored and removed by way of the lift truck.

Finally, the storage and retrieval unit should be provided with guidance profiles for accepting the lift truck, in order to guide its displacement on the lift beam of the storage and retrieval unit, however, with the guiding profile being removably arranged on the storage and retrieval unit and, in particular, pivotal, for accepting other transportation cases, i.e. particularly the long-goods cassette.

Furthermore, the present invention is additionally based on the object to provide a method for repositioning stored goods in a rack module, in order to reposition both pallets as well as long-goods cassette using the same storage and retrieval unit, which occurs with considerably less expense than in the case of the transportation sled described.

This objective is attained in a method with the features of claim 13 such that the transportation cases comprise pallets, that the pallets are repositioned by way of a lift truck, that, for this purpose, the lift truck moves under at least the pallet to be repositioned, that parts of the lift truck perform a lifting motion for raising the pallet, and that the lifting motion of the lift truck is caused by a gripping motion of the gripping device of the storage and retrieval unit. Thereby, the advantages described above in connection with the rack module according to the invention are achieved as well.

Due to the fact that the gripping motion of the gripping device essentially occurs in the horizontal direction, this horizontal gripping motion must be performed advantageously in a lifting motion oriented particularly in the vertical direction via a lifting device arranged on the lift truck. This way it is possible to use the gripping device, already present for the repositioning of cassettes, for lifting and repositioning pallets as well.

BRIEF DESCRIPTION OF THE DRAWINGS

Several features and advantages of the present invention result from the following description of exemplary embodiments using the drawings. In the drawings.

DETAILED DESCRIPTION OF THE PREFERRED EMBODIMENTS

Figure 1:
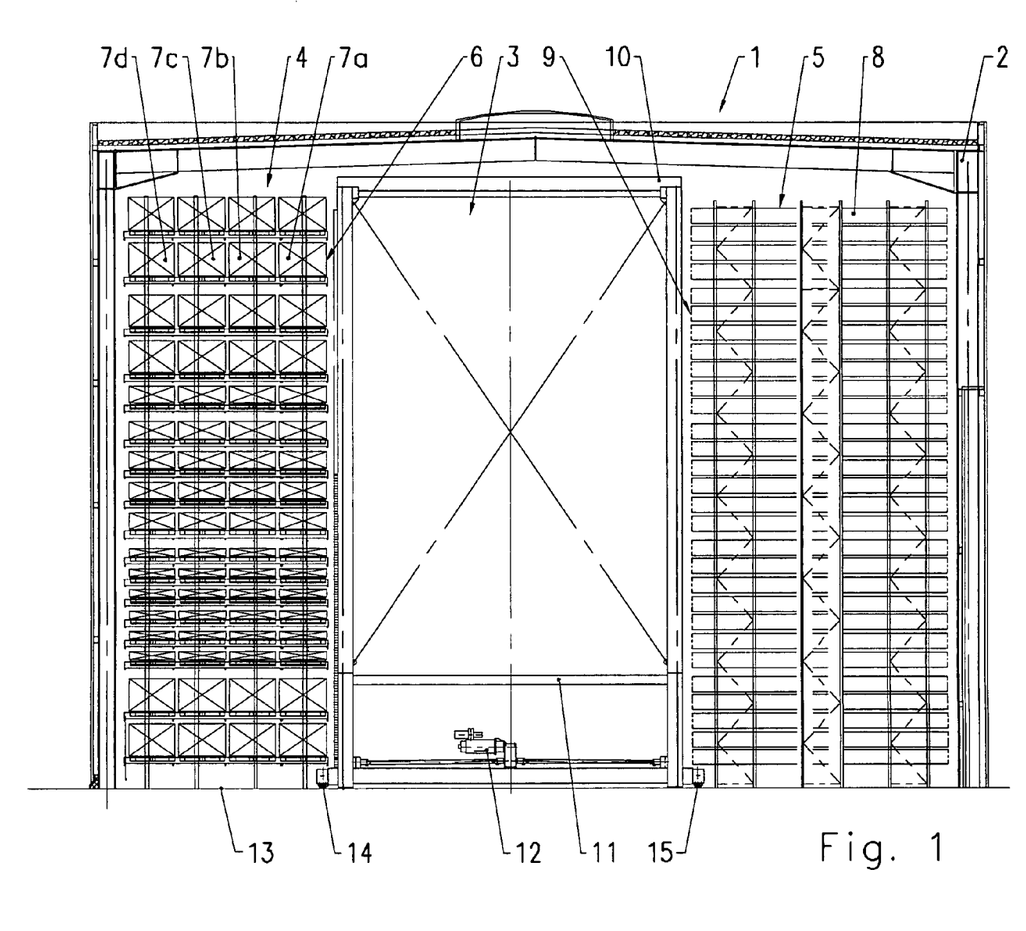
FIG. 1 is a side view of a rack module according to the invention.

In FIG. 1, in a schematic side view, a rack module 1 is arranged in a hall 2, with a storage and retrieval unit 3 in the middle of the hall can be moved in an area extending over the entire depth of the hall. At the side walls of the hall 2, two shelves 4, 5 are provided with the left shelf 4 in FIG. 1 serving to store pallets and the right shelf 5 in FIG. 1 serving to store long-goods cassettes. For this purpose, the pallets are stored in a multitude of shelf spaces 6 arranged side-by-side and over top of one another, with, in the exemplary embodiment shown, the shelf spaces providing space for accepting four pallets behind one another along the depth of the shelf (here, it is stressed that the shelf sections 6 in FIG. 1 are shown in a side view, and thus the four pallets 7a, 7b, 7c, 7d, positioned behind one another in a shelf space, are shown side by side in the drawing plane.) On the opposite side, the shelf 5 for long-goods cassettes 8 is also provided with several shelf sections 9, arranged side-by-side and over top of one another, which in FIG. 1 are also shown in a side view only.

The storage and retrieval unit 3 is provided with a frame 10, in a conventional manner, and a schematically shown lift beam 11 along with a displacement drive 12 for moving the storage and retrieval unit 3 along displacement rails 14, 15 provided in the floor 13 of the hall.

A lift truck, not shown in FIG. 1, can be displaced on the lift beam 11, with the lift truck being able to extend into the shelf spaces 6, in order to raise and remove even the pallet 7d stored farthest in the back.

Figure 2:
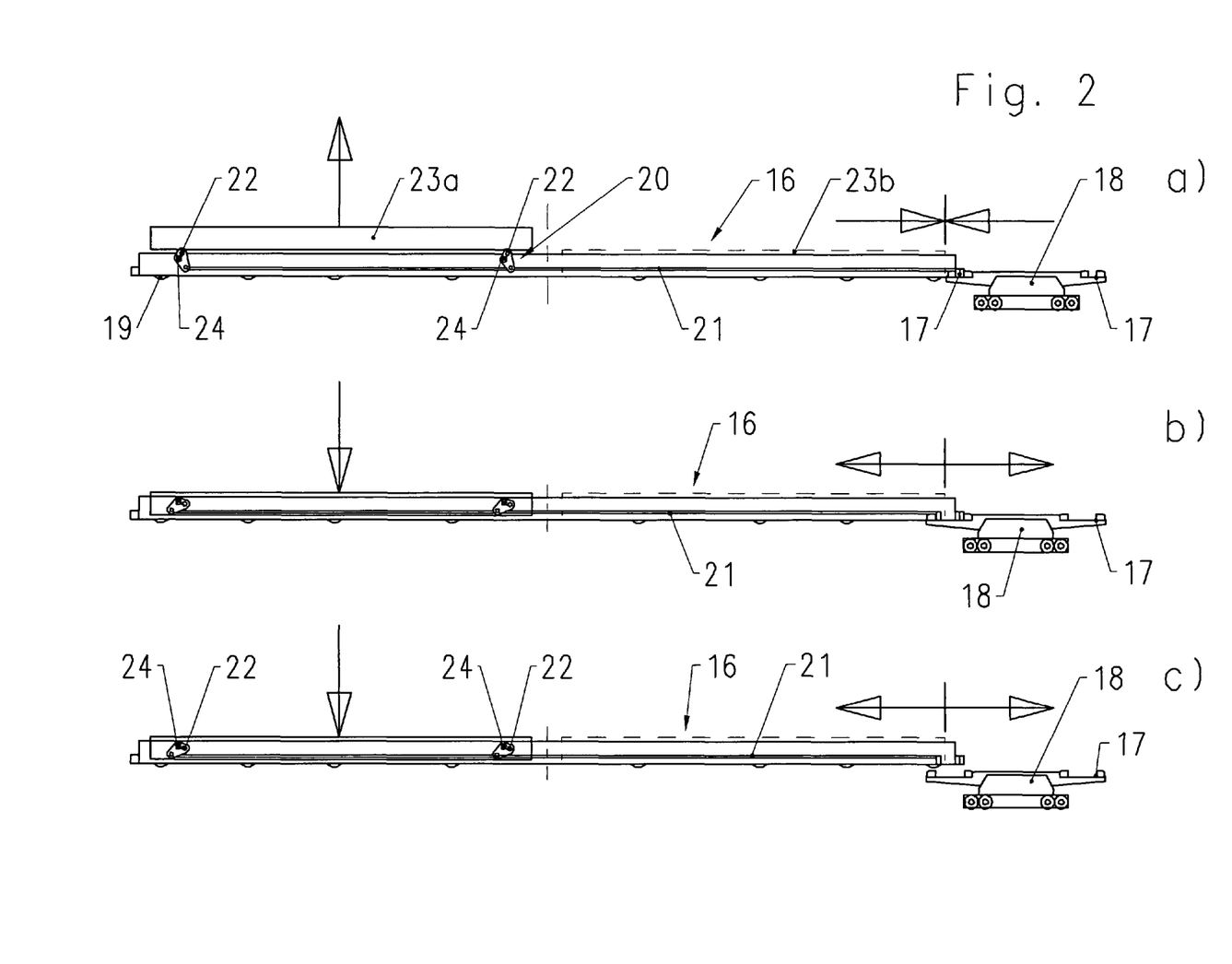
FIGS. 2a-2c are side views of a lift truck for a rack module according to the invention in three different positions.

Such an exemplary lift truck 16 is shown in FIG. 2, which, in the first position according to FIG. 2a, is engaged by a gripper 17 of a gripping device 18, which can be displaced on the lift beam 11. The lift truck 16 is provided, in particular, with a transportation means 19 in the form of rollers, by which the lift truck can be displaced on the lift beam horizontally all the way into the shelf sections, which, in particular, comprise a linkage assembly 21 and a pivotal lever arrangement 22 as well as a pallet support 23a, which is arranged such that it can be changed in its height in reference to the rest of the lift truck and, in particular, to the rollers 19. In addition to the pallet support 23a, a second pallet support 23b is shown in dot-dash lines, which can be operated independent from the first pallet support 23a and, in particular, via a second lifting device, not shown, which can be operated by the opposite end of the lift truck shown in FIG. 2, and which serves to reposition pallets, primarily on shelves located at the opposite side of the storage and retrieval unit.

If the lifting linkage assembly 21 is adjusted by the gripper according to the pliers-like gripping motion (as required for gripping long-goods cassettes) in the horizontal direction towards the right, the pivotal lever arrangement 22, which is connected, on the one hand, to the lifting linkage assembly 21 and, on the other hand, to the pallet support 23a, performs a pivotal motion about a rotation point 24 fixed in the lift truck and thus raises the pallet support 23 and/or lowers it.

FIG. 2b shows the position of a lift truck with a gripper 17 positioned in an intermediate position: here the gripper has already released the linkage assembly 21, which again is displaced horizontally towards the left and therefore the pallet support 23a is lowered downwards into a position which serves to insert and/or remove the lift truck without the pallet, i.e. for moving under pallets.

FIG. 2c shows the completely opened gripper at a later position, which is lowered in reference to the lift truck downwards to a certain extent for the complete release of the linkage assembly 21 in order to allow the lift truck to be stored in a shelf space, for example.

Figure 3:
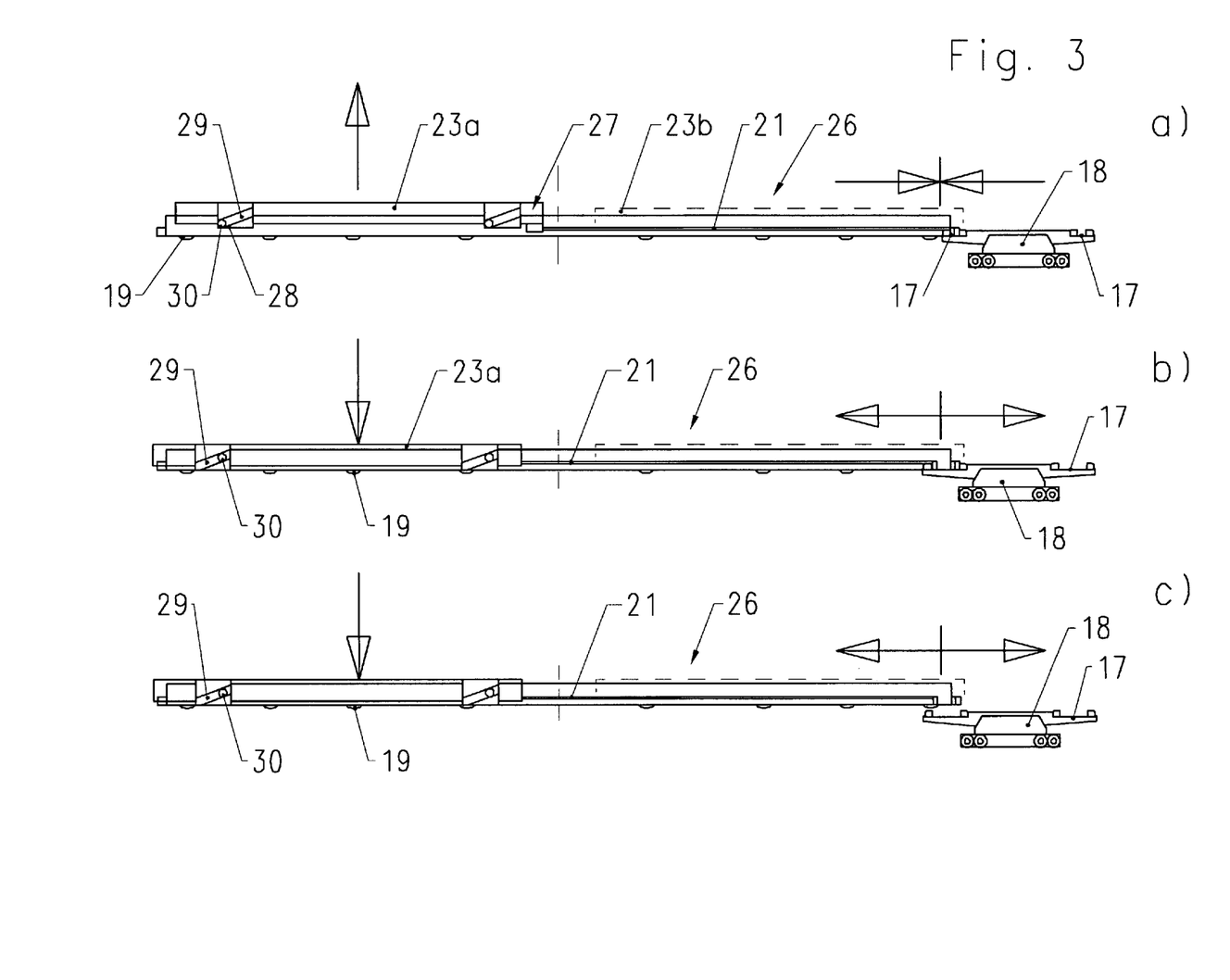
FIGS. 3a-3c are side views of an alternative embodiment of a lift truck, also in three different positions.

Alternatively, in the FIGS. 3a, 3b, and 3c, a lift truck 26 is shown, in which parts already embodied in the same manner in the lift truck 16 are provided with identical reference numbers. Instead of a pivotal lever arrangement 22, the lifting device 27 comprises lifting linkage assembly 21 and a guide arrangement 28, which again comprises a guiding rail 29, tilted laterally in reference to the horizontal plane, allocated to the pallet support 23a, and a guiding roll 30 allocated to the lift truck 26. If now, according to FIG. 3b, the lifting linkage assembly 21 is displaced towards the left by opening the gripper 17, the sloped guiding rail 29 is also displaced towards the left, so that the pallet support 23 is displaced downwards into the lowered position by the guiding roll 30 arranged locally fixed on the lift truck.

FIG. 3c again shows the completely opened gripper 17, lowered downwards.

Figure 4:
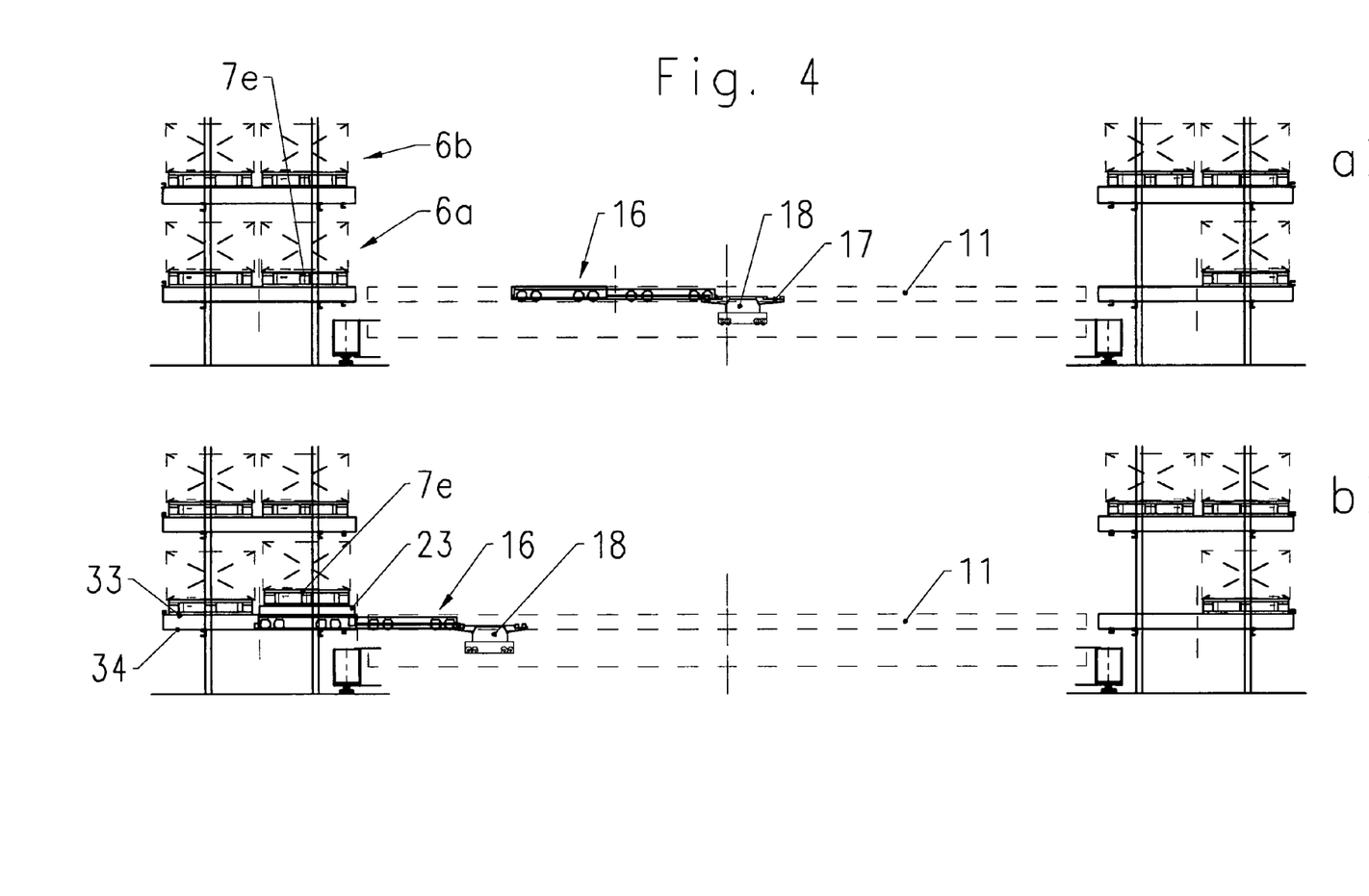
FIGS. 4a-4g are schematic side views of the storage and retrieval unit according to the invention which show a series of processing steps.

In FIGS. 4a through 4g, it is schematically shown how the lift truck 16 is displaced horizontally along the lift beam 11 of the storage and retrieval unit by means of the gripping device 18, in reference to FIG. 4a) towards the left in the direction of a pallet 7e. For this purpose, in FIG. 4a the gripper 17 is arranged in the opened intermediate position, i.e. the pallet support 23 is in the lowered position. The lift truck 16 moves towards the left, here, with its rollers 19 on drive rails 34 arranged below the pallet supports 33 of the rack module moving under the pallet 7e all the way into the shelf section 6a. The gripper 17 is closed and the pallet support 23 is lifted thereby, which causes it to contact the pallet 7e and raises the pallet 7e in reference to a pallet support 33, on which the pallet 7e had been supported.

In FIG. 4c, the loaded lift truck 16 returns with a closed gripper and the raised pallet support 23 back to the storage and retrieval unit. In FIG. 4d the gripper opens into an intermediate position and thereby lowers the pallet support 23 and the pallet 7e to the lift beam 11 of the storage and retrieval unit in order to put it there, while the lift truck begins to collect additional pallets 7f, 7g, 7h. For this purpose, according to FIG. 4e, the pallet 7e put onto the lift beam is again moved under by the lift truck (with the gripper opened in an intermediate position and the pallet support being lowered), in order to remove another pallet 7f located in the shelf space 6a, (see FIG. 4f).

This way it is possible to collect several pallets 7e, 7f, 7g, 7h, even from different shelf spaces 6a, 6b, and to store them intermittently on the lift beam of the storage and retrieval unit (see FIG. 4g) and, subsequently, to lower the storage and retrieval unit such that the pallets can be transported via the lift truck or another transportation device, for example to a further processing station, not shown.

Alternatively to this, it is possible of course, to embody the pallet support of the lift truck large enough for several pallets and, in particular, all pallets of a shelf space to be repositioned simultaneously, which of course considerably lowers the respective repositioning time.

Concluding, by the present invention, using extremely little expense, a possibility has been created to reposition both long-goods cassettes as well as pallets using the same storage and retrieval unit in order to be able to reposition primarily rod and plate-shaped but also almost any other storage goods using only one storage and retrieval unit and only one infrastructure connected thereto.

The invention claimed is:

1. A rack module for storage goods, located in transportation cases, comprising at least one shelf (4, 5) having several shelf spaces (6, 9) for accepting transportation cases arranged at least one of side-by-side or over top of one another, and at least one storage and retrieval unit (3), including a lateral displacement drive for movement back and forth between laterally adjacent ones of the shelf spaces, that is connected to a lift beam that is movable up and down for accessing vertically offset ones of the shelf spaces, and having a gripping device (18) that can be displaced in reference to the storage and retrieval unit for repositioning the transportation cases (7, 8), the transportation cases (7) comprise pallets (7a-7h), at least one lift truck (16, 26) is provided on the lift beam for moving under the pallets for repositioning the pallets, the lift truck includes a lifting device (20) for at least one of raising or lowering one or more of the pallets located on one of the shelf spaces, and the lifting device is actuatable to raise or lower by a gripper of the gripping device (18) of the storage and retrieval unit (3) that removably engages a linkage of the lifting device to cause the raising or lowering.

2. A rack module according to claim 1, wherein the lift truck (16, 26) is provided with a pallet support (23, 23a, 23b) as well as transportation means (19), by which the lift truck can be transported into one of the shelf spaces (6), the pallet support (23, 23a, 23b) is arranged such that a height thereof can be adjusted in reference to the transportation means from a lowered position to a raised position, and a change in height can be generated via the lifting device (20).

3. A rack module according to claim 2, wherein the shelf spaces (6, 6a, 6b) are provided with pallet supports (33) for the pallets (7, 7a-7h) to be stored and the pallet supports (33) of the shelf spaces are arranged higher than the pallet support (23) of the lift truck (16, 26) in the lowered position, and lower than the pallet support (23) of the lift truck (16, 26) in the raised position.

4. A rack module according to claim 1, wherein the transportation of the lift truck (16, 26) into and out of one of the shelf spaces (6, 6a, 6b) occurs through a horizontal displacement of the gripping device (18) that engages the lift truck.

5. A rack module according to claim 2, wherein the transportation means (19) comprise rollers or gliding rails.

6. A rack module according to claim 1, wherein the shelf spaces (6, 6a, 6b) are deep enough so that at least two of the pallets (7, 7a-7h) can be stored in one of the shelf spaces behind one another.

7. A rack module according to claim 1, wherein the lift truck (16, 26) can be operated for repositioning a front most or several frontal pallets of at least one of the shelf spaces (6, 6a, 6b) or all of the pallets arranged behind one another (7, 7a-7h) in one of the shelf spaces.

8. A rack module according to claim 1, wherein the lift truck is adapted for accepting several pallets to be stored behind one another, and includes a pallet support having a length extending in a direction of the depth of the shelf spaces, which is equivalent to an overall depth of at least two pallets arranged behind one another.

9. The rack module according to claim 1, wherein the lifting device (20) is provided with a pivotal lever arrangement (22) or a guided rod assembly (28, 29) for height adjustments.

10. A rack module according to claim 1, wherein the shelf spaces (6, 6a, 6b) are provided with driving rails (34) extending in a direction of the depth of the shelf spaces for the transportation means (19) of the lift truck (16, 26).

11. A rack module according to claim 1, wherein the storage and retrieval unit is provided with guiding profiles for accepting the lift truck and the guiding profiles for accepting other transportation cases are arranged removably or pivotably on the storage and retrieval unit.

12. A rack module according to claim 1, wherein the griping device is movable separately from the lift truck.

13. A method for repositioning storage goods in a rack module comprising providing at least one or more shelves (4, 5) with storage spaces (6, 6a, 6b, 9) arranged at least one of side-by-side or over top of one another and with at least one storage and retrieval unit (3) including a lateral displacement drive for movement back and forth between laterally adjacent ones of the shelf spaces, that is connected to a lift beam that is movable up and down for accessing vertically offset ones of the shelf spaces, and a gripping device (18) for repositioning the stored goods, with the stored goods being accepted inside transportation cases (7, 7a-7h) and the transportation cases being repositionable at least one of out of or into the shelf spaces by , the transportation cases (7) comprise pallets (7a-7h), repositioning the pallets via at least one lift truck (16, 26) that is movably located on the lift beam for moving under the pallets, and for repositioning the pallets, moving the lift truck (16, 26) under at least the pallet (7, 7a-7h) to be repositioned, performing a lifting motion with parts (23, 23a, 23b) of the lift truck (16, 26) for raising the pallet (7, 7a-7h), and causing the lifting motion of the lift truck via a removable engagement of a linkage of the lift truck utilizing a gripping motion of the gripping device (18) of the storage and retrieval unit.

14. A method according to at least claim 13, wherein the gripping motion of the gripping device (18) occurs generally in a horizontal direction and the horizontal gripping motion is converted into a lifting motion oriented generally in a vertical direction via a lifting device (20) arranged on the lift truck (16, 26).

15. A method according to claim 13, wherein the transportation cases also comprise cassettes (8), the method including repositioning both the pallets (7, 7a-7h) as well as the cassettes (8) with the same storage and retrieval unit (3).

* * * * *